United States Patent

[11] 3,543,924

[72] Inventors George R. Ryan
1431 Henry Place, Waukegan, Illinois 60085;
Robert A. Sullivan, Arlington, Virginia
[21] Appl. No. 718,169
[22] Filed April 2, 1968
[45] Patented Dec. 1, 1970
[73] Assignee Said Sullivan assignor to said Ryan

[54] TESTING APPARATUS
17 Claims, 4 Drawing Figs.
[52] U.S. Cl. .................................................. 209/74,
209/81; 324/54
[51] Int. Cl. .................................................. B07c 5/344
[50] Field of Search .......................................... 209/81, 73,
74, 75; 324/52, 54, 71

[56] References Cited
UNITED STATES PATENTS
| | | | |
|---|---|---|---|
| 1,427,817 | 9/1922 | Hutchinson .................. | 209/81 |
| 2,320,516 | 6/1943 | Gammeter .................... | 209/81 |
| 2,609,094 | 9/1952 | Fry .............................. | 324/54X |
| 2,615,964 | 10/1952 | Hubertz ....................... | 209/81X |
| 3,082,871 | 3/1963 | Duncan ........................ | 209/81 |

Primary Examiner—Allen N. Knowles
Attorney—Hibben, Noyes and Bicknell

ABSTRACT: A high voltage apparatus which tests plastic parts molded on a mold core pin to detect perforations or cracks therein and which is integrally associated with the molding apparatus.

Patented Dec. 1, 1970

Inventors
George R. Ryan
Robert A. Sullivan
By Hibben, Noyes & Bicknell
Attorneys Inventors
George R. Ryan
Robert A. Sullivan
By Hibben, Noyes & Bicknell
Attorneys

TESTING APPARATUS

This invention relates generally to apparatus for testing molded parts and more particularly to apparatus for testing molded parts for imperfections with high voltage electricity while the molded part remains on its mold core pin.

When a molded part is formed by injection molding of a thermoplastic material defects in the molded part occasionally occur, and most frequently the imperfections, such as holes, cracks or the like, are found in the area adjacent the mold gate at the outer end of the molded part. For example, thermoplastic molding material is occasionally pulled away from the molded part by the mold gate when the part is removed from its mold cavity, leaving an opening in the end wall of the molded part.

It is therefore an object of the present invention to provide improved means using high voltage electricity for testing the molded part for imperfections.

It is a further object of the present invention to provide improved means integral with molding apparatus for testing a molded part for imperfections.

It is a still further object of the present invention to provide improved apparatus for testing a molded part using high voltage electricity while the part remains on its mold core pin.

Other objects of the present invention will be apparent to one skilled in the art from the following detailed description and claims when read in conjunction with the accompanying drawing wherein:

Figure 1:
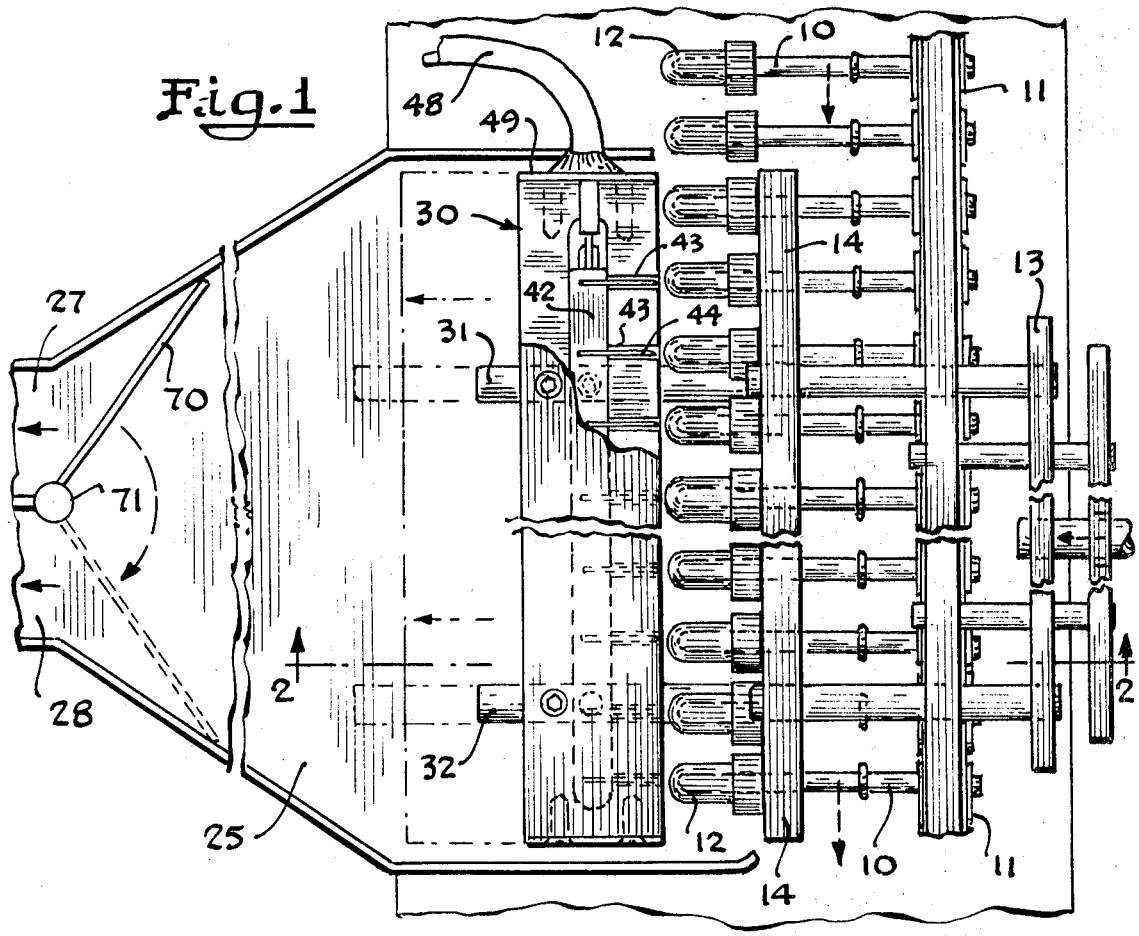
FIG. 1 is a fragmentary top plan view of apparatus embodying the present invention.
Figure 2:
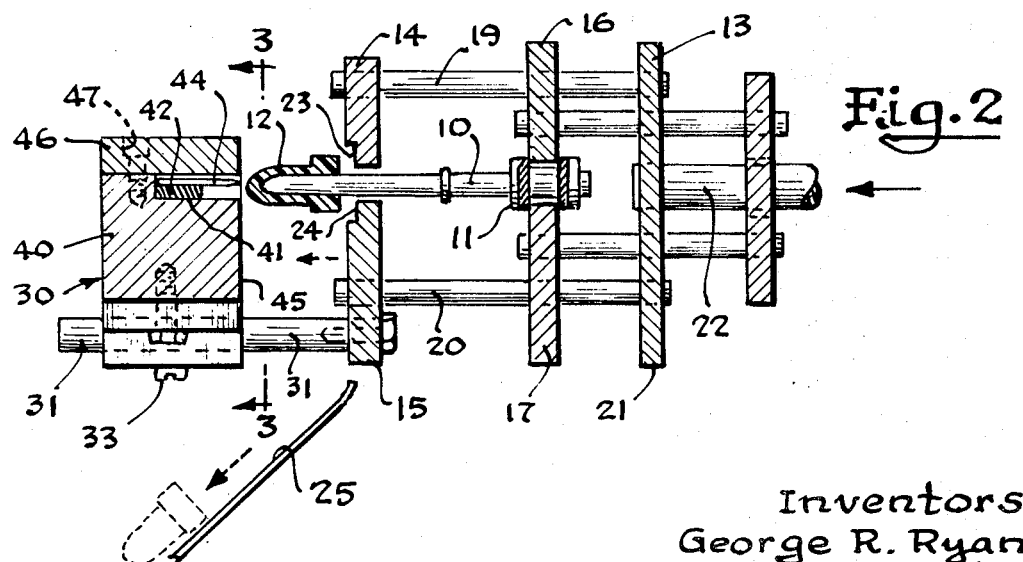
FIG. 2 is a vertical sectional view partially in elevation taken along the line 2-2 of FIG. 1.
Figure 3:
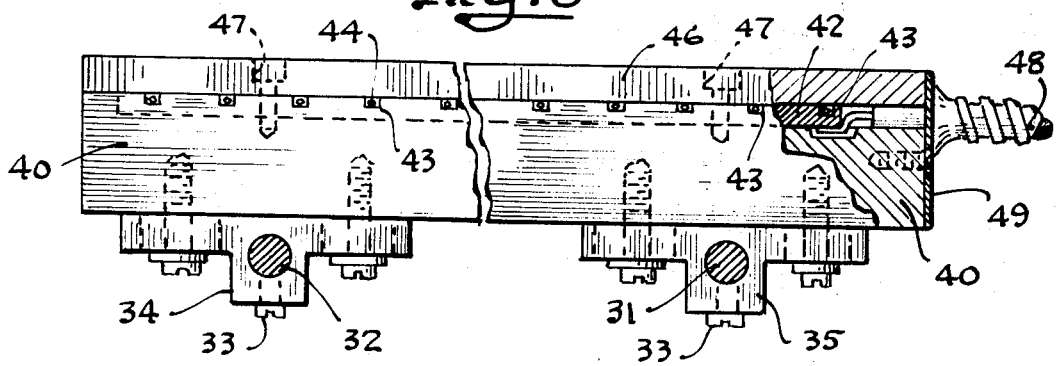
FIG. 3 is an elevational view partially in vertical section taken along the line 3-3 of FIG. 2.

In the apparatus shown in FIGS. 1—3 of the drawing, a plurality of molded parts formed of an electrical nonconductive thermoplastic material are molded on an electrical conductive metal mold core pin at an injection molding station, preferably using molding apparatus of the type described in the George R. Ryan U.S. Pat. No. 3,135,993 or in any other apparatus desired. The molded part, preferably while the part remains on its mold core pin, is conveyed to a mold core pin stripping station where the molded part is removed from the mold core pin, as described in the Ryan U.S. Pat. No. 3,135,993. The testing apparatus embodying the present invention in FIGS. 1-—3 is integrally associated with the elements of the mold core pin stripping means.

In the preferred embodiment of the present invention, the mold core pins 10 comprising an integral part of an endless line chain 11 and having a thermoplastic part 12 molded about the outer end of each pin are advanced stepwise and accurately positioned by means of a Geneva gear arrangement (not shown) at the mold core stripping station 13 while the mold core pin stripper bars 14, 15 are in a fully retracted position. At the stripping station the line chain 11 is engaged by retaining bars 16, 17 to prevent lateral movement of the chain 11 during the removal of the molded part 12 from the mold core pin 10.

As best shown in FIGS. 1 and 2 the upper and lower stripper bars 14, 15 are supported by spaced rods 19, 20 held in a movable header 21 which is secured to the end of a rod member 22 associated with a hydraulic piston means (not shown), whereby the header 21 is movable transversely in a direction parallel to the longitudinal axis of the mold core pin 10. The mold core pin stripping bars 14, 15 are maintained behind the molded part 12 formed on the end of the mold core pins 10 with the forward lateral surfaces 23, 24 of the mold core stripping bars 14, 15 adapted to contact the end of the molded part when the mold core stripping bars 14, 15 are moved outwardly toward the end of the mold core pins 10, thereby disengaging and removing the molded parts 12 from the mold core pins 10. The molded parts 12 fall onto a hopper tray 25 and chute means 27, 28, and the parts 12 are conveyed to a suitable packaging or assembly station (not shown).

A high voltage electrical tester assembly 30 is adjustably supported adjacent the outer ends of the molded parts 12 on the mold core pins 10 by the spaced supporting rods 31, 32 which are secured to the lower stripper bar 15. The tester assembly 30 is adjustably positioned on the support bars by means of suitable setscrews 33 in a mounting brackets 34, 35 which engage the support rods 31, 32 so that the tester assembly 30 can be used with various sized mold core pins and molded parts.

The tester assembly 30 is comprised generally of a nonconductive plastic base section 40 having a groove 41 formed in the upper surface thereof to receive a suitable electrical conductive metal strip 42. The groove extends substantially the length of the base section and has extending transversely therefrom at spaced points along the length thereof small grooves or recesses 43 which extend to the edge of the base section. Each of the grooves is adapted to accommodate a small diameter pointed electrically conductive metal needle or probe 44. The metal needle or probe 44 is soldered directly to the metal strip or otherwise placed in secure electrical contact therewith and the strip 42 and probes 44 are mounted in the base section so that the end of the needles are flush or even with the forward surface 45 of the block 40. A protective cover plate 46 is mounted on the upper surface of the base section and is secured thereto by suitable screw means 47. The electrically conductive strip 42 is connected with a suitable source of high voltage electricity by means of a cable 48 extending inwardly through a passage in the end plate 49.

Figure 4:
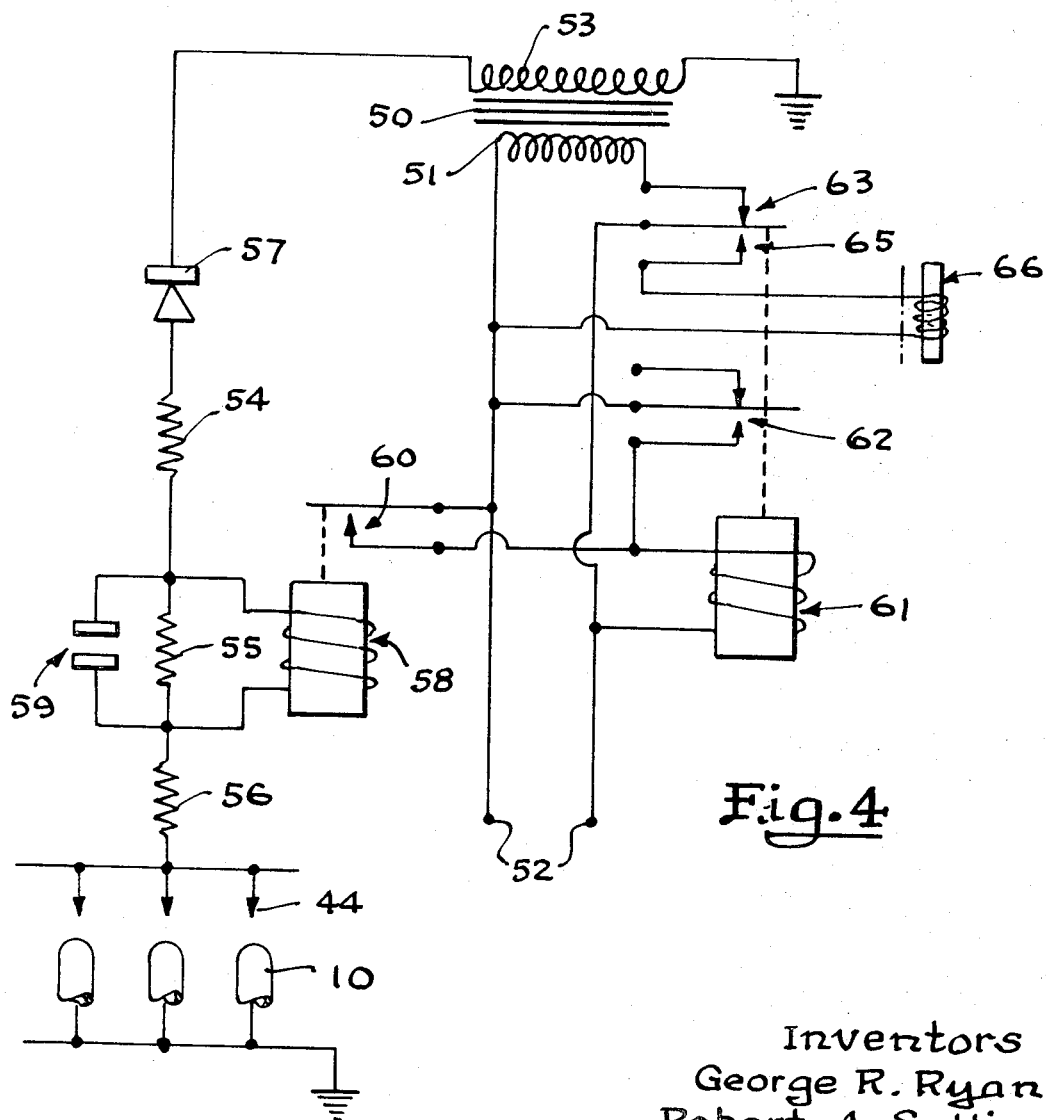
FIG. 4 is a schematic wiring diagram illustrating electrical control means used in the testing apparatus of the present invention.

The operation of the improved testing apparatus 30 will be described specifically by references to the schematic electrical wiring diagram shown in FIG. 4 taken in conjunction with FIGS. 1—3 of the drawing.

In normal operation, molded parts 12 formed of plastic or other electrically nonconductive material supported on the core pins 10 which are formed of an electrically conductive material, such as a ferrous metal, are conveyed to a position directly opposite and in line with the probes 44 formed of an electrically conductive material. As the stripper bars 14, 15 are moved forward by means of a hydraulic cylinder which is activated by a solenoid valve, the bars 14, 15, engage the ends of the molded parts 12 and strip the parts from core pins 10. At the instant the electric current is connected to the solenoid valve activating the hydraulic cylinder which moves the stripper bars 14, 15, the electrical current is simultaneously applied to the testing apparatus 30. Thus, as the striper bars 14, 15, and the molded parts 12 start to move outwardly, the probes 44 are electrically activated.

The testing apparatus 30 is comprised of a high voltage transformer 50 (See FIG. 4) having the primary coil 51 of the transformer energized by a common source of electrical power 52 through the normally closed relay contacts in the electrical circuit connected with the primary winding of the high voltage transformer 50 (i.e., 5,000 volts at 30 ma.). Usually no current flows in the secondary coil 53 of the transformer 50, and correctly molded parts 12 form an effective dielectric barrier between the probes 44 and the core pins 10, and each of the core pins 10 is grounded through the conveying mechanism to the supporting frame of the molding machine. The molded parts 12 are stripped as described heretofore and fall into hopper tray 25 and move downward through discharge chute 28 to suitable packaging or assembly apparatus (not shown). So long as no defectively molded parts 12 are formed, the secondary coil 53 and associated electrical circuit remains open and no current flows.

If an improperly molded part 12 with a defective end section is among those conveyed to and positioned opposite the ends of probes 44, however, electrical current immediately flows in the form of an arc discharged from probes 44 to core pins 10, thus completing the secondary circuit of transformer 50. This current is limited by resistors 54, 55 and 56 and is rectified by diode 57. The voltage drop across resistor 55 serves to actuate relay 58 and charge capacitor 59 (preferably 0.1 μfd.—600 VDC) which serves to control the dropout time of relay 58. The contacts 60 on relay 58 close and activate relay 61 (preferably 115 VAC coil, DPDT contacts—10 amps). The contacts 62 on relay 61 cause this relay to lock in closed position. The contacts 63 on relay 61 open the primary circuit of transformer 50, thus interrupting the current at the probes 44 and causing relay 58 to open, The contacts 65 on relay 61 energize solenoid 66 which operates flapper valve 70 causing the stripped parts 12 which includes a defective part to pass from hopper tray 25 into discharge reject chute 27. The power source 52 is interrupted automatically by a means suitable actuated by the stripper bars 14, 15 or by the associated elements when the stripper bar reaches the end of its outward travel, and relay 61 opens, deenergizing solenoid 66, allowing spring return mechanism 71 to return flapper valve 70 to its original (full line) position.

It will be evident that while the solenoid 66 is energized and flapper valve 70 is held in open position (as shown in dotted line FIG. 1), all the parts removed from the mold core pins, including the defective part, pass downwardly through the chute 27 to a holding area separated from the packaging or assembly area for the perfectly molded parts.

Transformer 50 is of such a size as to produce a voltage at the probes 44 sufficient to cause an arc between probes 44 and core pins 10, through any openings that exist in the end of molded part 12, and usually a voltage of about 5,000 volts is sufficient.

Resistor 54 (preferably two 4,700 ohm/2 watt in series), resistor 55 (preferably one 12,000 ohm/2 watt and one 47,000 ohm/2 watt in series) and resistor 56 (preferably five 12,000 ohm/2 watt in series), and diode 57 (preferably 5,000 PIV) modify the electrical characteristics of the arc so that burning of the core pins 10 is minimized. Resistors 54, 55, 56 also serve to limit the current in the arc, and diode 57 produces a pulsating current at the probes 44. Damage to the core pins 10 by the arc is further minimized by deenergizing the primary coil 51 of transformer 50 by opening relay contacts 63 as soon as an arc passes between probe 44 and pin 10, causing relay 58 (preferably 10,000 ohm, SPST (NO) contacts and activated at 5 ma. current) to be energized.

In the foregoing preferred embodiment of the invention the probes having the high voltage electrical charge have the form of a needle with a single needle disposed opposite the end of the molded part. It should be understood, however, that a plurality of needles can be disposed at spaced points about the outer surface of the molded part in order to detect imperfections in the molded part at points other than at the outer end thereof. It is also possible, for example, to employ probes having a form other than a needle, and if desired the probe can have a shape which conforms to the outer form of the molded part, and one or more shaped probes can be used to surround the entire outer surface of a molded part.

In the preferred embodiment of the present invention the molded part has been tested while the part remains on the mold core pin on which the part is molded. It will be readily understood, however, that a molded part can also be tested for perforations or other imperfections by employing the same principal and general procedure which is used in the preferred embodiment after the molded part has been removed from the mold core pin.

We claim:

1. Apparatus for testing a molded part for imperfections which comprises; an electrically conductive support member for supporting a molded part adjacent one end thereof, a support member stripper bar adapted to engage said part on said support member and movable axially along said support member, a probe disposed in spaced relationship with said stripper bar and having associated therewith means for supplying an electrical current thereto which is sufficient to establish a flow of current in said support member when a said molded part having an imperfectly molded section is supported on said support member with said imperfectly molded section disposed adjacent the end of said probe, said stripper bar and said probe being movable as a unit while electric current is supplied to said probe and while said stripper bar is engaging said part to effect removal of said part from said support member, electrically controlled means adapted to be activated by said flow of current in said support member and directing when activated said part having an imperfectly molded section to a retaining area separate from an area where only perfectly molded parts are retained.

2. An apparatus as in claim 1, wherein a first switch means which is actuated simultaneously with the movement of said stripper bar into engagement with said molded part to effect removal of said part from said support member and which supplies electric current to said probe, and a second switch means which is actuated by said stripper bar at the end of outward movement after effecting removal of said part from said support member and which interrupts electrical current being supplied said electrical control means and effects deactivation thereof.

3. An apparatus as in claim 1, wherein means are provided for interrupting said electric current supplied to said probe comprising a capacitor delayed electrical relay means actuated by the flow of current in said support member.

4. An apparatus as in claim 1, wherein said means for supplying said electric current comprises a high voltage transformer adapted to supply a high voltage half-wave rectified alternating current from the secondary winding thereof.

5. An apparatus as in claim 1, wherein said support member is a mold core pin on which said molded part is adapted to be formed under pressure.

6. An apparatus for testing a dielectric part for imperfections which comprises; and electrically conductive support member for supporting a dielectric part, means engageable with the part for stripping the part from said support member, a probe disposed adjacent said part, means including said support member and said probe for establishing an electrical test circuit when said part on said support member has an imperfection, and means movably mounting said stripping means and said probe for movement as a unit as said stripping means effects removal of said part from said support member.

7. An apparatus as in claim 6, including a plurality of support members each adapted to support a dielectric part, said electrical test circuit establishing means including a plurality of probes in alinement with respective support members, said stripping means including means for simultaneously stripping all the parts from said support members.

8. An apparatus as in claim 6, including means for adjusting the distance between said support member and said probe.

9. An apparatus as in claim 6, including means controlled by the establishment of said test circuit for interrupting said test circuit to minimize any damage that can result from arcing between said support member and said probe.

10. An apparatus as in claim 6, wherein said probe and support member have a high voltage transformer means associated therewith for supplying to said support member a high voltage half-wave rectified alternating current from the secondary winding of said transformer when said part has an imperfection therein.

11. An apparatus as in claim 10, wherein said probe and support member have associated therewith means for interrupting said circuit comprising a capacitor delayed electrical relay actuated by the flow of current in said support member.

12. An apparatus for testing a dielectric part for imperfections which comprises; and electrically conductive support member for supporting a dielectric part, a probe disposed adjacent the part, means including said support member and said probe for establishing an electrical test circuit when the part has an imperfection, and means controlled by the establishment of said test circuit for automatically interrupting said test circuit to minimize any damage that can result from arcing between said support member and said probe.

13. An apparatus as in claim 12, wherein said test circuit interrupting means includes a relay, means associated with said relay for controlling the dropout time of said relay, and switch means controlled by said relay.

14. An apparatus as in claim 12, including means operative following completion of said test circuit for diverting parts with imperfections to a retaining area separate from an area where only perfect parts are retained.

15. An apparatus as in claim 12, including means for diverting parts with imperfections to a retaining area separate from an area where only perfect parts are retained, said test circuit interrupting means including a first relay, means associated with said first relay for controlling the dropout time of said first relay, and a second relay operated by said first relay, said second relay having switch means effective when said second relay operates for actuating said diverting means and for interrupting said test circuit.

16. A method of testing a dielectric part for imperfections, comprising the steps of; providing a dielectric part supported on a support member, moving the support member and its dielectric part relative to a probe to a position in which the probe is in adjacent relationship with the outer surface of the dielectric part, establishing a voltage difference between the probe and the support member to provide a test circuit through any imperfection in the dielectric part, and automatically interrupting the test circuit to minimize any damage that can result from arcing between the support member and the probe.

17. A method as in claim 16, including the steps of simultaneously stripping the dielectric part from the support member and moving the probe the probe away from the support member.